(12) United States Patent
Kothari et al.

(10) Patent No.: US 12,551,715 B2
(45) Date of Patent: Feb. 17, 2026

(54) INTRAORAL PHOTOTHERAPY PROBE

(71) Applicant: MuReva Phototherapy Inc., Strongsville, OH (US)

(72) Inventors: Vedang Kothari, San Diego, CA (US); Jordan W. Oja, Stow, OH (US); Jason D. Lazzara, Cleveland, OH (US); Samuel J. Shelnutt, Olmsted Township, OH (US)

(73) Assignee: MUREVA PHOTOTHERAPY INC., Strongsville, OH (US)

( * ) Notice: Subject to any disclaimer, the term of this patent is extended or adjusted under 35 U.S.C. 154(b) by 382 days.

(21) Appl. No.: 17/759,859

(22) PCT Filed: Mar. 4, 2021

(86) PCT No.: PCT/US2021/020855
§ 371 (c)(1),
(2) Date: Aug. 1, 2022

(87) PCT Pub. No.: WO2021/178655
PCT Pub. Date: Sep. 10, 2021

(65) Prior Publication Data
US 2024/0024694 A1    Jan. 25, 2024

Related U.S. Application Data

(60) Provisional application No. 62/984,805, filed on Mar. 4, 2020.

(51) Int. Cl.
*A61N 5/06*    (2006.01)

(52) U.S. Cl.
CPC .... *A61N 5/0613* (2013.01); *A61N 2005/0606* (2013.01); *A61N 2005/0626* (2013.01);
(Continued)

(58) Field of Classification Search
None
See application file for complete search history.

(56) References Cited

U.S. PATENT DOCUMENTS

2006/0167531 A1* 7/2006 Gertner ............... A61N 5/0603
607/86
2009/0319008 A1* 12/2009 Mayer ................. A61N 5/0624
607/90
(Continued)

FOREIGN PATENT DOCUMENTS

GB    2443318 A    4/2008
WO    93/18715 A1   9/1993
(Continued)

OTHER PUBLICATIONS

International Preliminary Report on Patentability for corresponding PCT application PCT/US2021/020855 mailed on Jun. 15, 2021.

*Primary Examiner* — Mallika D Fairchild
(74) *Attorney, Agent, or Firm* — Renner, Otto, Boisselle & Sklar, LLP

(57) ABSTRACT

According to an exemplary embodiment, an intraoral phototherapy device is provided for that improves tissue illumination. Oral tissue illumination is particularly difficult in the oral cavity inside of the teeth. That is, it is particularly difficult to illuminate the roof of the mouth and tissues located towards the back for the throat. The intraoral phototherapy device improves illumination of these tissues using a probe having a cylindrical main body.

17 Claims, 7 Drawing Sheets

(52) U.S. Cl.
CPC .............................. *A61N 2005/063* (2013.01); *A61N 2005/0644* (2013.01); *A61N 2005/0652* (2013.01); *A61N 2005/0659* (2013.01)

(56) References Cited

U.S. PATENT DOCUMENTS

| | | | |
|---|---|---|---|
| 2010/0100160 A1* | 4/2010 | Edman | A61B 5/444 607/88 |
| 2010/0160904 A1* | 6/2010 | McMillan | A61B 18/24 606/18 |
| 2012/0246858 A1 | 10/2012 | De Vries et al. | |
| 2018/0008837 A1 | 1/2018 | Zhang | |

FOREIGN PATENT DOCUMENTS

| | | |
|---|---|---|
| WO | 2006/103678 A2 | 10/2006 |
| WO | 2008/124918 A1 | 10/2008 |
| WO | 2017/044931 A1 | 3/2017 |
| WO | 2019/165302 A1 | 8/2019 |
| WO | 2019/222492 A1 | 11/2019 |

* cited by examiner

10

INTRAORAL PHOTOTHERAPY PROBE

RELATED APPLICATIONS

This application claims the benefit of PCT/US2021/020855 filed on Mar. 4, 2021, and U.S. 62/984,805 filed on Mar. 4, 2020. Both of which are herein incorporated by reference in their entirety.

TECHNICAL FIELD

The present disclosure relates generally to phototherapy and more particularly to an intraoral phototherapy probe.

BACKGROUND

Phototherapy can be utilized for treating and providing pain relief for various conditions, including a condition called Oral Mucositis (OM). Phototherapy can be delivered in several ways, e.g., directly to the tissue via Low Level Laser Therapy (LLLT) or via a light emitting diode (LED) array that propagates light through the skin into the affected region.

Currently there are two known methods for administering phototherapy for the treatment of various phototherapy treatment conditions of the mouth including, but not limited to Oral Mucositis (OM), low level laser therapy and light emitting diode (LED) arrays. Oral Mucositis is one of the most common and highly significant toxicities of cancer therapy.

Barriers to the acceptance of low-level laser therapy include the cost of laser equipment and the labor intensiveness. Additionally, there are problems with interoperator variability and the need for specialized training. Also patients receiving this form of treatment are required to hold their mouths open for long periods of time which is uncomfortable and becomes extremely painful as the Mucositis progresses.

SUMMARY

The present disclosure provides an intraoral phototherapy device including a probe having a cylindrical main body for illuminating the oral cavity.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
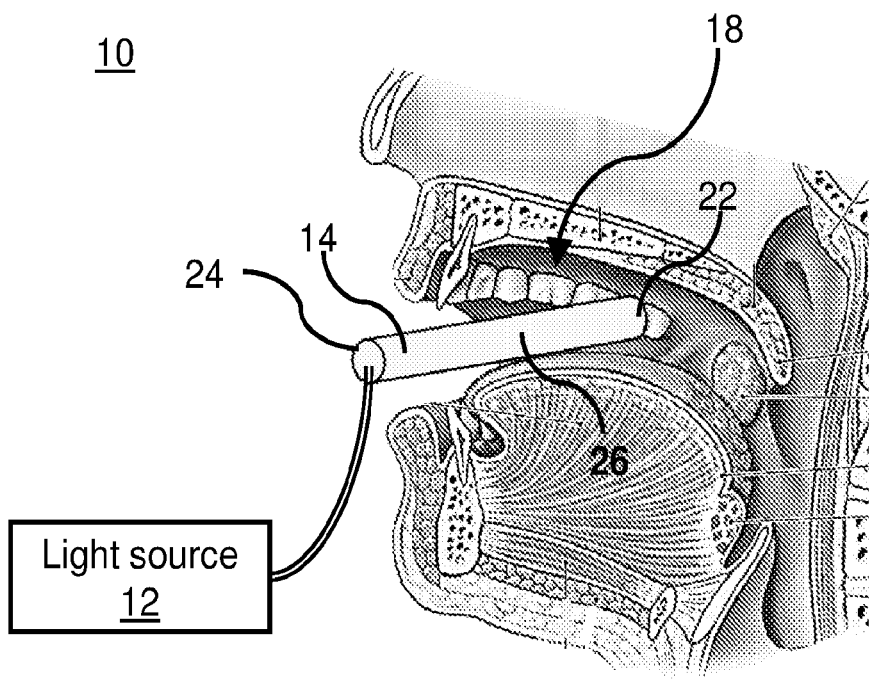
FIG. 1 is a schematic view of an embodiment of a phototherapy system including an external light source and a probe inserted in an oral cavity.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

According to an exemplary embodiment, an intraoral phototherapy device is provided that improves tissue illumination. Oral tissue illumination is particularly difficult in the oral cavity inside of the teeth. That is, it is particularly difficult to illuminate the roof of the mouth and tissues located towards the back for the throat. The intraoral phototherapy device improves illumination of these tissues using a probe having a cylindrical main body.

According to a further exemplary embodiment, an intraoral phototherapy device is provided that enables individualized phototherapy based on patient need. The intraoral phototherapy device allows for separate control of light emission from areas of the intraoral phototherapy device, such that different tissues receive different optical doses.

Figure 2:
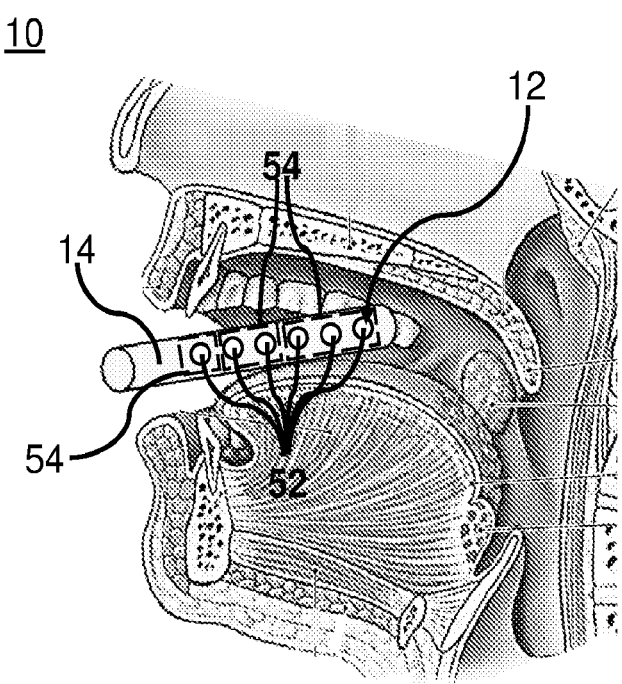
FIG. 2 is a schematic view of an embodiment of the phototherapy system having a probe including a light source inserted in an oral cavity.

In the embodiment shown in FIGS. 1 and 2, a phototherapy system 10 is shown for delivering phototherapy to an oral cavity 18. The phototherapy system 10 includes a light source 12 and a probe 14. The light source 12 emits light 16 and the probe 14 directs emission of the light 16 onto the oral cavity 18 when the probe 14 is positioned within the oral cavity 18. The probe 14 includes a cylindrical main body having a distal end 22.

In the embodiment shown in FIG. 1, the light source 12 is positioned outside of the oral cavity 18. The probe 14 acts as a light guide by receiving the light emitted by the light source 12 at a proximal end 24 of the probe 14 and transmitting the light (e.g., via total internal reflection) to at least one of the distal end 22 of the probe 14 or a lateral surface 26 of the probe 14. For example, the probe 14 may be configured both to emit light out of the distal end 22 to illuminate the tonsillar tissues and to emit light out of the lateral surface 26 to illuminate roof of the mouth and dorsal surface of the tongue. In FIG. 1 the light source 12 is located separate from (i.e., not physically supported by) the probe 14 and communicates the light 16 to the probe 14 via a light guide.

Alternatively, in the embodiment shown in FIG. 2, the light source 12 is supported by the probe 14 (e.g., operatively mounted to the proximal end 24). For example, the light source may be mechanically supported by the probe 14, such that the light source 12 is located within the oral cavity 18 when the probe 14 is inserted into the oral cavity 18.

The light source 12 may be at least one of a light emitting diode (LED) array, a single high-powered LED, a fiber optic transmitting light, a fiber optic cable, microLEDs, or a laser. As described above, the light source 12 may be located in an enclosure separate from or attached to the probe 14 or the light source 12 may be operatively mounted to the probe 14, such that the light source 12 is located within the oral cavity 18 when the probe 14 is inserted into the oral cavity 18.

The light source may emit any suitable wavelength of electromagnetic radiation. The light source 12 may emit light having a wavelength from 600 nm to 1000 nm. For example, the light source 12 may emit electromagnetic radiation having a wavelength approximately equal to at least one of 630 nm, 660 nm, 670 nm, 810 nm, or 880 nm. In one embodiment, the light source may emit both therapeutic light and infrared or near infrared light, such that penetration of the therapeutic light into tissues of the oral cavity is improved. That is, the infrared or near infrared light may improve tissue penetration of the therapeutic light. For example, the light source may emit light having a wavelength known to kill bacteria in the mouth.

Figure 3:
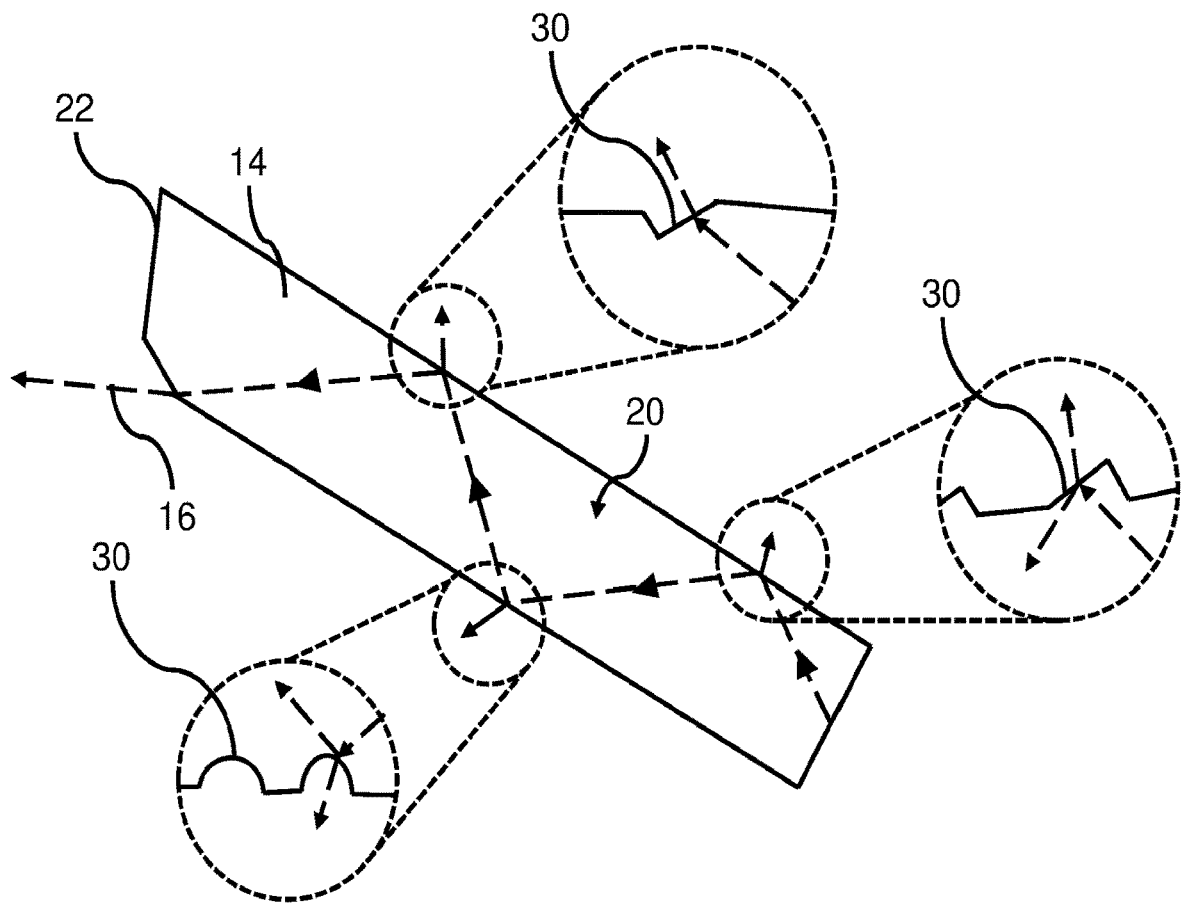
FIG. 3 is a schematic view of an embodiment of an intraoral phototherapy probe having light extracting features.
Figure 4:
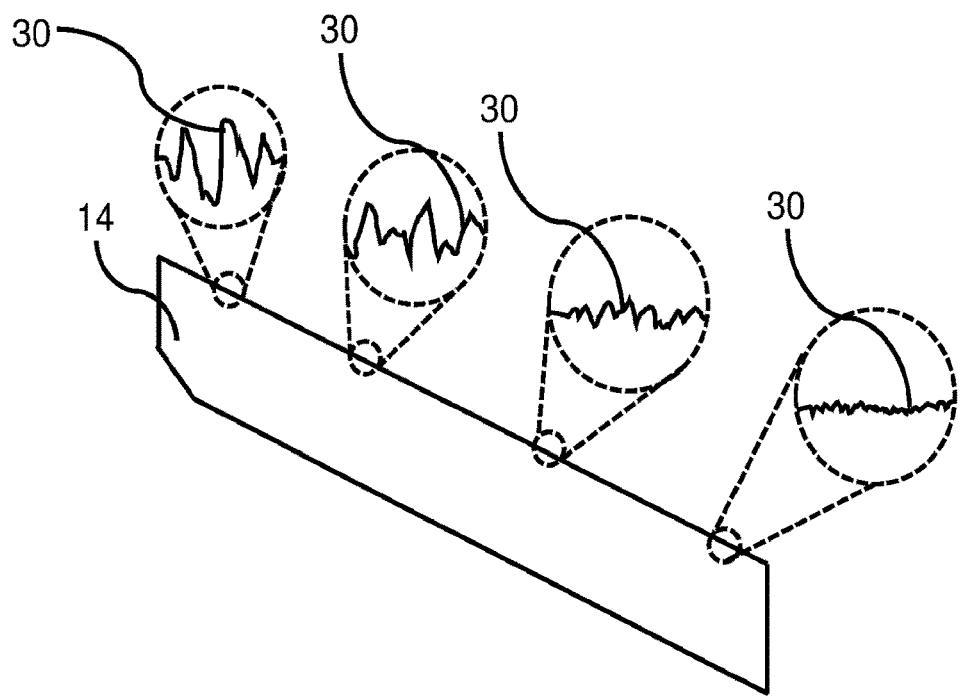
FIG. 4 is a schematic view of an alternative embodiment of the intraoral phototherapy probe having light extracting features.

In the embodiment shown in FIGS. 3 and 4, the probe 14 includes light-extracting features 30 configured to cause the transmitted light 16 to be emitted from the probe 14. As described above the light 16 may be emitted from at least one of the distal end 22 or a lateral surface 26 of the probe 14. The light-extracting features may include at least one of microscopic interruptions to a surface of the probe, lensing features in the probe surface, a rippled surface of the probe, a varying cross-sectional area of the probe, or varying surface finishes along the surface of the probe configured to extract light along the length of the probe.

In the embodiment shown in FIG. 3, different light-extracting features 30 are located along the lateral surfaces 26. In the embodiment shown in FIG. 4, the light-extracting features 30 vary along the lateral surface 26 with locations located closer to the distal end 22 including larger interruptions to the lateral surface 26. The light-extracting features 30 may be chosen such that the light 16 emitted from the probe has a selected pattern (also referred to as a distribution). For example, the light-extracting features 30 may be chosen such that the roof of the mouth and the dorsal surface of the tongue are preferentially illuminated compared to other tissues of the oral cavity.

Figure 5:
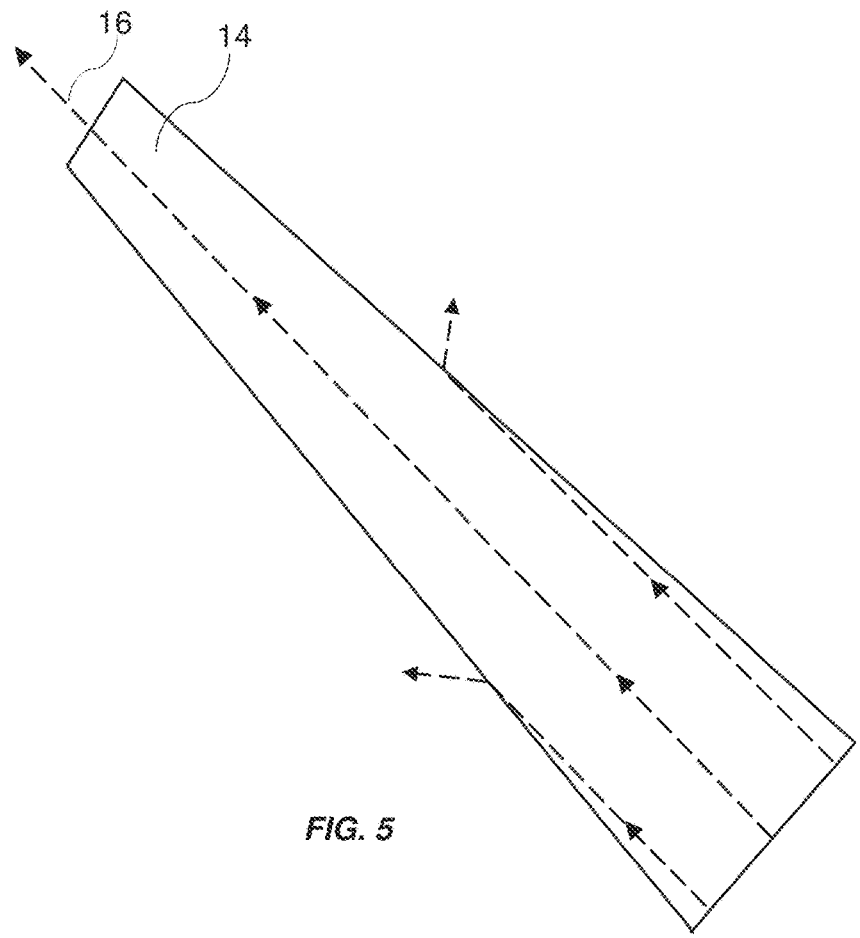
FIG. 5 is a schematic view of an embodiment of the intraoral phototherapy probe having a varying cross sectional area.
Figure 6:
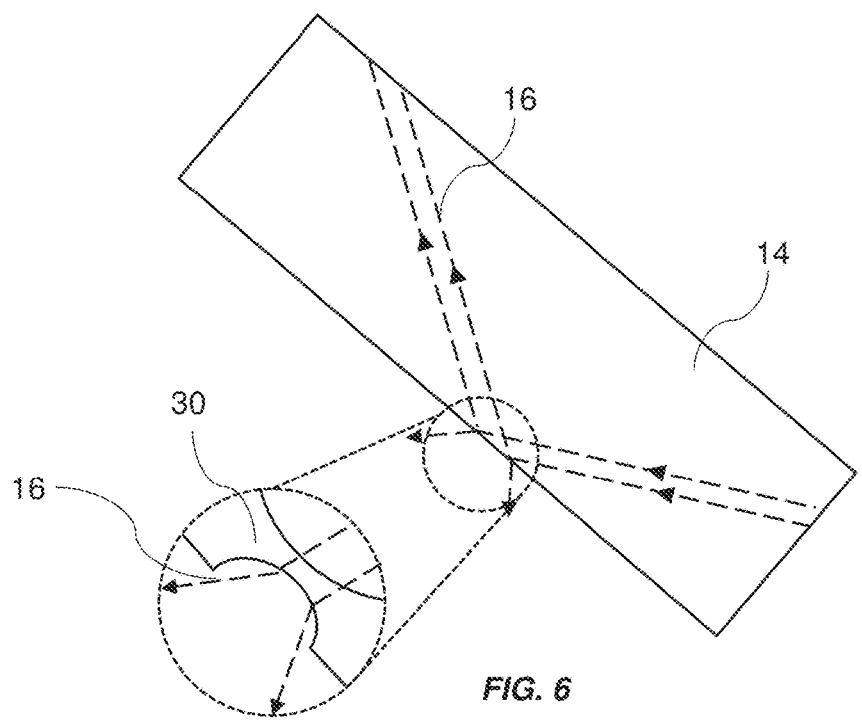
FIG. 6 is a schematic view of an embodiment of the intraoral phototherapy probe having light-extracting features.

In the embodiment shown in FIG. 5, the main body 20 has a varying cross-sectional area. In the embodiment shown in FIG. 6, the main lateral surface 26 has light-extracting features 30 including lensing features. In the embodiment shown in FIG. 7, the light-extracting features 30 are included on the distal end 22 of the probe 14. In this example, the light-extracting features 30 include a lensing feature that focuses light at a distance from the distal end 22. Such a light-extracting features 30 may be used to target tissues distant from the distal end 22 (e.g., tonsillar tissues).

The main body 20 may have a cylindrical shape. For example, the embodiment shown in FIG. 5 may have a circular, elliptical, or convex cross section. The cross section may also vary in size and/or shape between the proximal end 24 and the distal end 22. For example, only a portion for the main body 20 (e.g., at least 50%, 80%, or 90%) may have a cylindrical shape.

Figure 7:
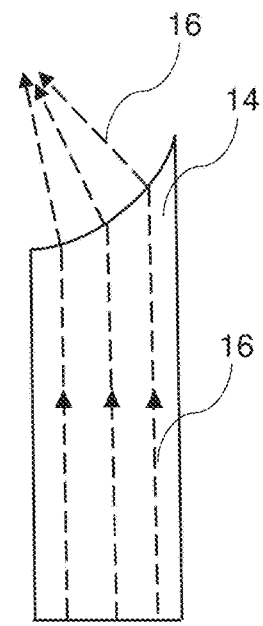
FIG. 7 is a schematic view of an embodiment of the intraoral phototherapy probe having a light-extracting feature that focuses light.
Figure 8:
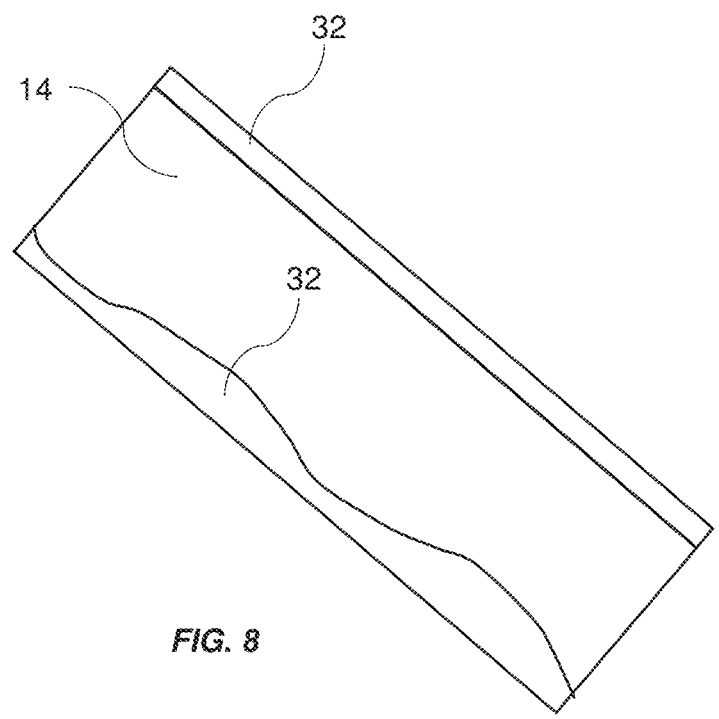
FIG. 8 is a schematic view of an embodiment of the intraoral phototherapy probe having a cladding layer.

In the embodiment shown in FIG. 8, the probe 14 includes a cladding layer 32. The cladding layer 32 may have a varying refractive index and/or a varying thickness to control light emission. For example, the cladding 32 may be shaped to increase uniformity of light emitted by the probe 14 by redistributing light. In FIG. 7, a portion of the lateral surface 26 includes a cladding layer 32 having a varying thickness, while another portion for the later surface 26 includes a cladding layer 32 having a constant thickness.

Figures 9, 10:
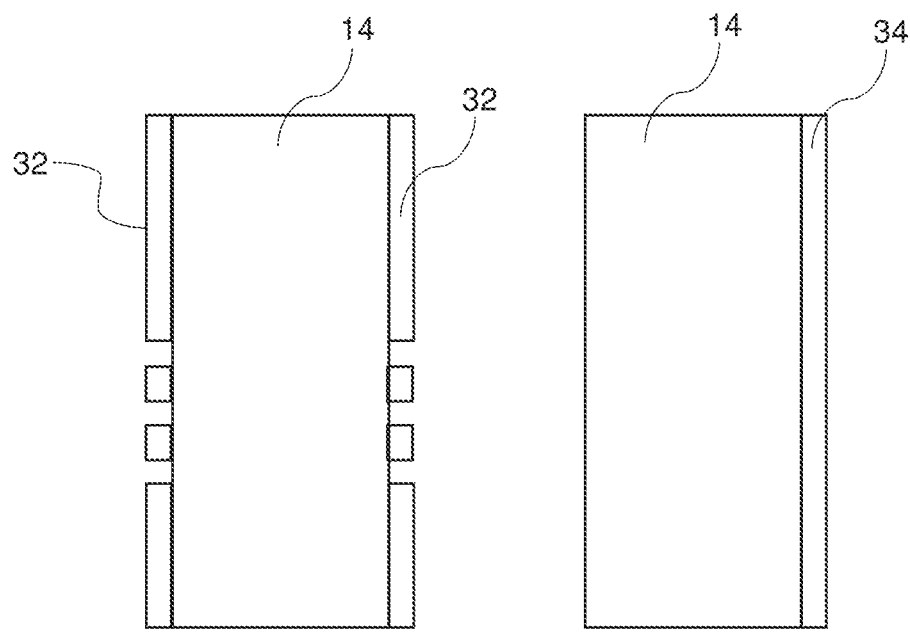
FIG. 9 is a schematic view of an embodiment of the intraoral phototherapy probe having cladding for dispersing hotspots.
FIG. 10 is a schematic view of an embodiment of the intraoral phototherapy probe having a reflector.

In the embodiment shown in FIG. 9, the cladding layer 32 includes openings. These openings in the cladding layer 32 may result in increased light emission from these areas. Also, by increasing the number of size of these openings, an amount of light emitted from the openings in the cladding layer 32 may also be controlled. The cladding layer 32 modulates emission of light 16 from the probe 14. The cladding layer 32 may be any suitable material. The cladding layer 32 may improve emission of light from the probe 14 due to scattering of the light by the cladding layer 32, thereby redistributing light.

In the embodiment shown in FIG. 10, the probe 14 includes a reflector 34. The reflector 34 may be used to control emission from the probe 14. For example, the reflector 34 may be angled to alter a distribution of light exiting from the probe 14. The reflector 34 may include a white silicone overmolded over the probe 14.

Figure 11:
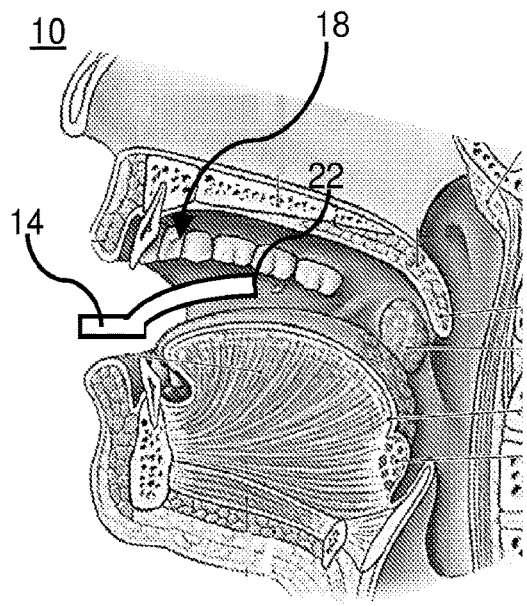
FIG. 11 is a schematic view of an embodiment of the phototherapy system having a curved probe.

In the embodiment shown in FIG. 11, the probe 14 has a curved contoured shaped tapering towards the distal end 22 and conforming to a geometry of the oral palate 18. However, as shown in FIGS. 12-15, the probe 14 is not limited to this shape. Rather, the probe 14 may have any suitable shape. Also, the probe 14 may have a curved contoured shape and also a cylindrical shape. As described, in one embodiment, cylindrical shape refers to the probe 14 as having a circular, elliptical, or convex cross sectional area. The entirety of the probe 14 is not limited to having such a cross sectional area, but rather a majority of the probe 14 may have such a shape. In another embodiment, at least 75% or at least 90% of the probe 14 has a circular, elliptical, or convex cross sectional area.

Figure 15:
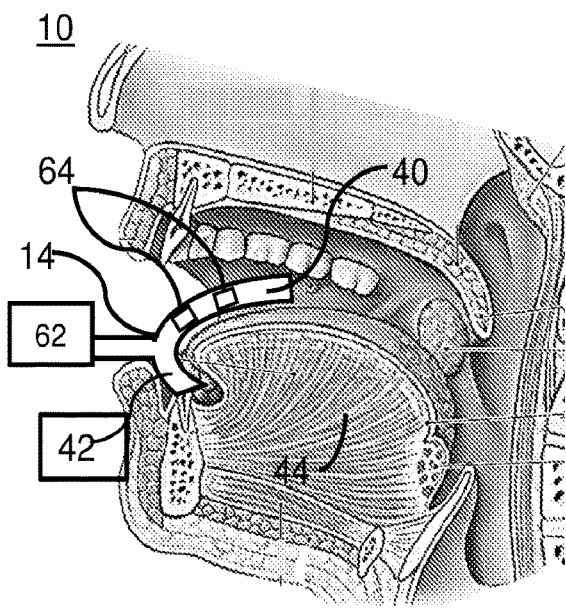
FIG. 15 is a schematic view of an embodiment of the phototherapy system having a curved probe located above and below the tongue.
Figure 19:
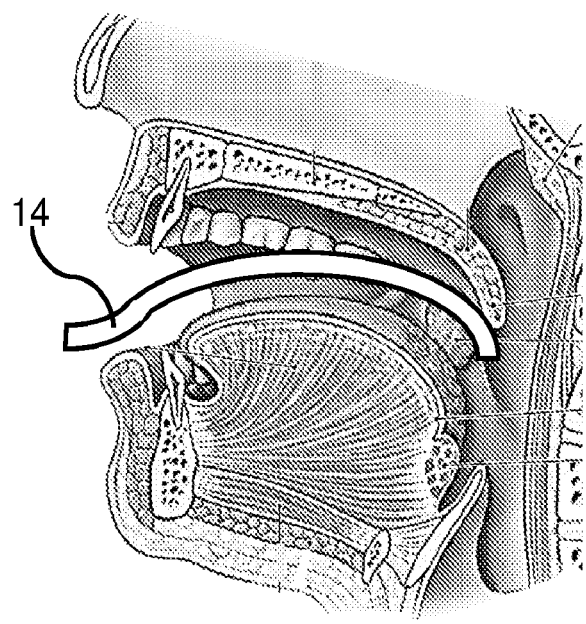
FIG. 19 is a schematic view of an embodiment of the phototherapy system having a curved probe projecting into a back of the throat.

In one embodiment, the shape of the probe is malleable such that a geometry of the probe 14 is customizable to fit oral cavity contours of multiple different users. As shown in the embodiment of FIG. 15, the probe 14 may be sized to avoid inducing a gag reflex by avoiding extending into the throat when inserted into the oral cavity. For example, the probe 14 may include a numbing agent configured to avoid inducing a gag reflex. In the embodiment shown in FIG. 19, the probe 14 extends towards the back of the throat such that the emitted light illuminates tissues of the throat.

The probe 12 may be made of any suitable material. In one embodiment, a portion of the probe 12 is made from a soft and/or flexible optically transparent material having a shore A durometer of 60 or less and a percent elongation of greater than 100%. For example, the surface of the probe 12 may have a shore A durometer of 60 or less and a percent elongation of greater than 100%. In an embodiment, the probe is made of at least one of acrylic, glass, silicone, or a polymeric material. As an example, the probe 14 may be made of different formulations of polycarbonate, polymethyl methacrylate, polystyrene, nylon, acrylonitrile butadiene styrene, polyolefin, or other biocompatible thermoplastic elastomer formulations.

Figure 12:
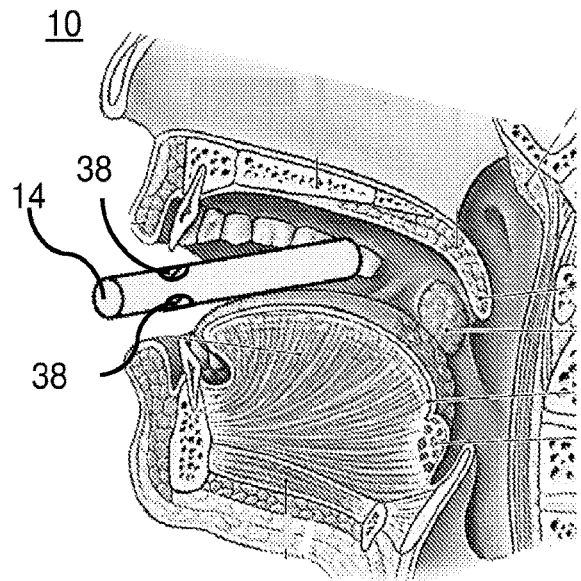
FIG. 12 is a schematic view of an embodiment of the phototherapy system having a probe including locating features located between the teeth.
Figure 13:
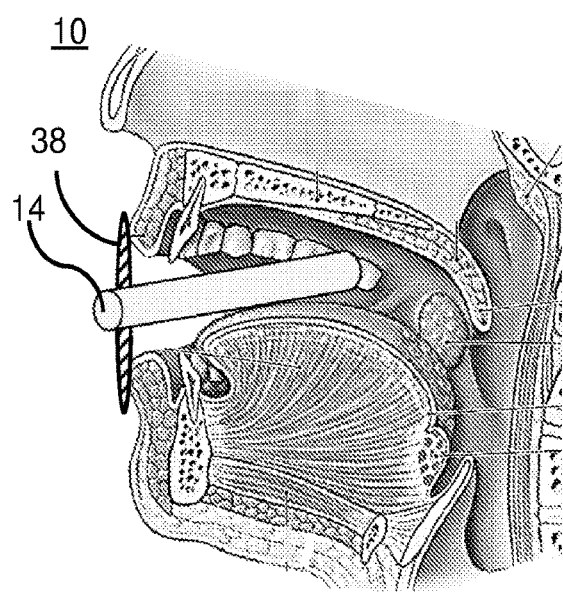
FIG. 13 is a schematic view of an embodiment of the phototherapy system having a probe including locating features located outside the oral cavity.
Figure 14:
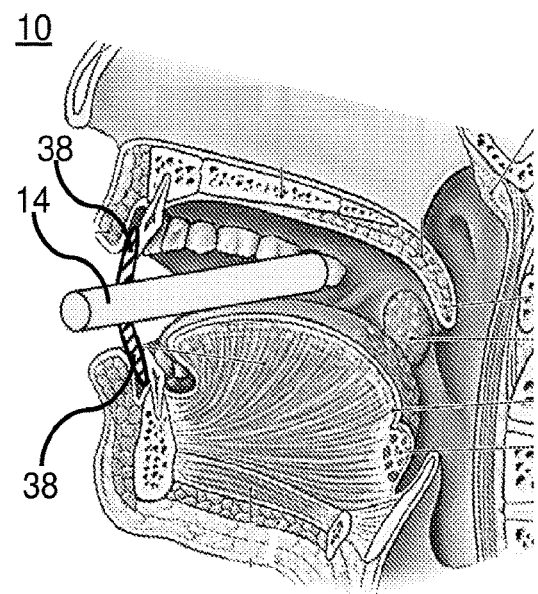
FIG. 14 is a schematic view of an embodiment of the phototherapy system having a probe including locating features located between the teeth and lips.

In the embodiment shown in FIGS. 12-14 the probe 14 includes location features 38. The location features 38 include irregularities in a surface of the probe 14 that, when the probe is located within the oral cavity, engage with at least one of the teeth, lips, or palate. The location features 38 are configured to ensure that the probe 14 is placed in a particular position and orientation within the oral cavity 18 when the location features are positioned adjacent the corresponding structures of the oral cavity 18. In the embodiment shown in FIG. 12, the location features 38 are configured to engage with the teeth (e.g., incisors) of the oral cavity 18. In the embodiment shown in FIG. 13, the location features 38 are configured to engage with an exterior surface of the lips (i.e., to be positioned outside for the oral cavity 18). In the embodiment shown in FIG. 14, the location features 38 are configured to be positioned between the teeth and lips of the oral cavity 18. The location features 38 are not limited to these embodiments, but may include any suitable structures (e.g., depressions, protrusions, etc.) on the probe surface.

In the embodiment shown in FIG. 15, the probe 14 includes a primary body 40 and a secondary body 42. The primary body 40 is configured to be positioned with the oral cavity 18 above the tongue 44 when the probe is inserted into the oral cavity 18. The secondary body 42 is configured to be positioned under the tongue 44 while the primary body 40 is positioned above the tongue 44 when the probe is inserted into the oral cavity 18, such that light emitted from the secondary body 42 illuminates a ventral surface of the tongue and/or a floor of the mouth including a submandibular duct and/or sublingual glands. For example, the secondary body 42 may have a length that is less than half the length of the primary body 40.

Figure 16:
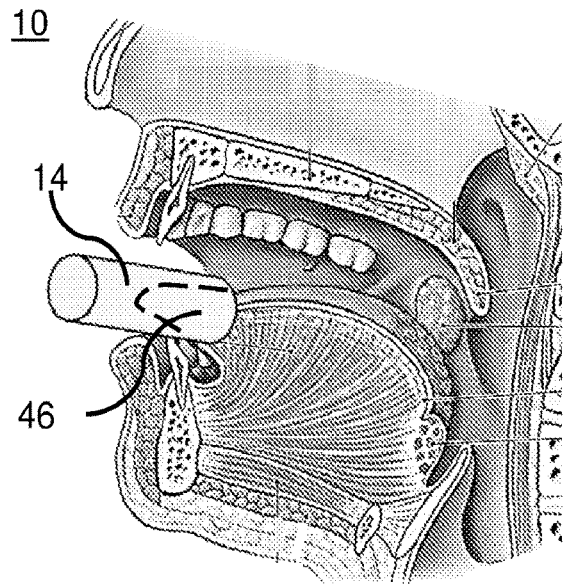
FIG. 16 is a schematic view of an embodiment of the phototherapy system having a tubular probe.

In the embodiment shown in FIG. 16, the probe 14 has a shape configured to illuminate lateral edges of a tongue 44 when the probe 14 is inserted into the oral cavity 18. The shape of the probe 14 is concave and is configured to curve around the tongue 44 and/or the probe 14 includes at least a portion of a tube configured to receive at least a portion of the tongue 44 inside the tube. That is, the probe 14 may have a concave shape to surround at least a portion for the tongue so that the lateral edges of the tongue are illuminated in addition to at least one of the dorsal or ventral surface of the tongue. In the embodiment shown in FIG. 16 the probe 14 includes a tube that a portion for the tongue 46 is inserted into. The portion for the tongue received by the probe 14 may be at least 25% of an oral tongue of the patient. Use of the term "oral tongue" herein refers to a body of the tongue between the apex of the tongue and the foramen cecum of the tongue. In another embodiment, the received portion of the tongue includes at least 15%, at least 50% or at least 75% of the oral tongue. In a further embodiment, the received portion of the tongue includes at least one of (1) a portion of the frenulum or (1) at least one of the submandibular salivary ducts. In one embodiment, the probe 14 has an open tubular cross section. For example, the cross section be circular or elliptical including at least 30%, 50%, or 80% of the perimeter of the cross section.

Figure 17:
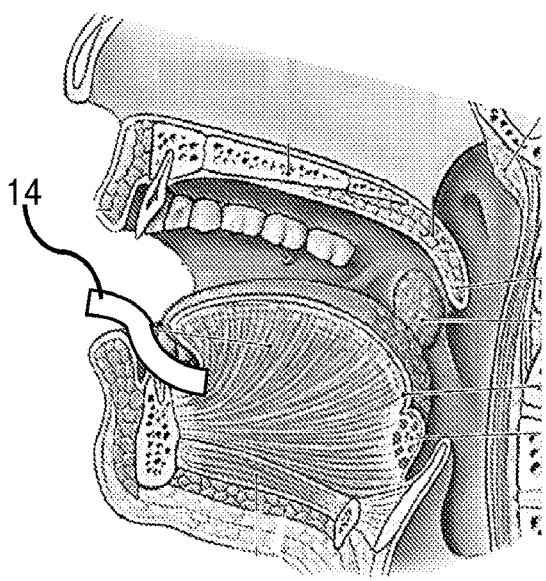
FIG. 17 is a schematic view of an embodiment of the phototherapy system having a curved probe located beneath the tongue.

In the embodiment shown in FIG. 17, when positioned within the oral cavity, a portion of the probe 14 is configured to be positioned under a tongue such that light emitted by the probe 14 illuminates a ventral surface of the tongue and/or a floor of the oral cavity including a submandibular duct and/or sublingual glands.

Figure 18:
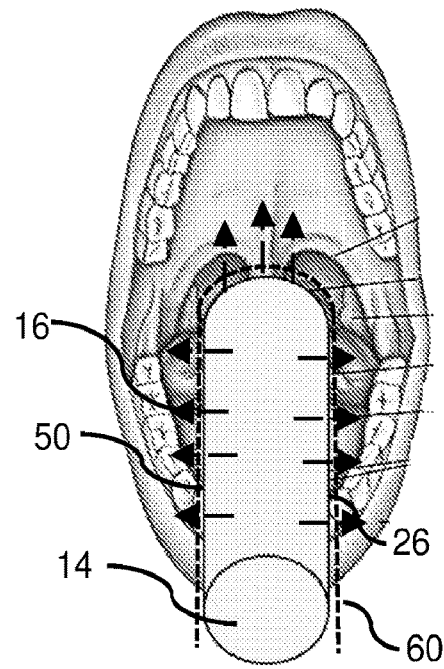
FIG. 18 is a schematic view of an embodiment of the phototherapy system having a probe covered by a sleeve.

In the embodiment shown in FIG. 18, the probe 14 includes a lateral surface 50. The probe 14 is configured to emit light from the lateral surface 50 such that buccal tissues of the oral cavity 18 are illuminated when the probe is inserted into the oral cavity 18. In FIG. 18 the probe 14 is shown as emitting light 16 from a left and right lateral surface of the probe 14. However, the probe 14 may emit light 16 from only a single lateral surface of the probe 14.

As described above, the light 16 is received by tissues of the oral cavity 18. The light 16 may have a wavelength and/or intensity, such that a portion for the emitted light 16 illuminates internal cranial and mandibular structures (e.g., bone, muscle, and brain matter).

The probe 14 may include different sections 54 and each of the sections may be configured to illuminate at least one of the targeted tissues when inserted into the oral cavity 18. For example, the light source 12 may include multiple light emitters 52. Each of these light emitters 52 may be positioned, such that light form the light emitter 52 is directed towards a particular tissue. The position of the light emitters 52 relative to the tissues of the oral cavity 18 may be determined based on positioning of the probe 14 within the oral cavity 18 (e.g., by using the location features 30). The probe 14 is configured to emit light simultaneously from the different sections, such that the light emitted by the probe is configured to provide phototherapy to all targeted tissues simultaneously.

In the electromagnetic shown in FIG. 2, the light source 12 includes multiple light emitters 52 and the probe 14 includes multiple sections 54. Each of the multiple light emitters 52 is associated with one of the sections 54, such that each of the sections 54 emits the light from the associated light emitter 52. The light source 12 modulates the light emission by each of the multiple light emitters 52, such that at least two of the targeted tissues are illuminated at different times when the probe is inserted into the oral cavity 18.

The sections of light emitters 52 may be separately controlled to vary the optical dose received by different tissues of the oral cavity during phototherapy. The light emitters 52 may include at least one of buccal light emitters, top tongue light emitters, bottom tongue light emitters, mouth roof light emitters, or mouth floor light emitters. The groups of light emitters may be separated in name only. That is, the different groups of light emitters 50 may be controlled together with other light emitter groups. Similarly, different light emitter groups may be independently controlled.

The phototherapy system may additionally include a controller configured to control emission of the light by the controller. The controller may also control dosage of light to tissues of the oral cavity by setting an optical intensity and emission time to predetermined values to achieve a desired dosage.

The targeted regions of the oral cavity may include at least one of the tongue, mandibular and maxillary buccal surfaces of the oral cavity, the floor and roof of the oral cavity, and tonsillar tissues. In one embodiment, the targeted regions of the oral cavity include the tongue, mandibular and maxillary buccal surfaces of the oral cavity, the floor and roof of the oral cavity, and tonsillar tissues. The intraoral phototherapy device 10 may apply phototherapy unevenly across the tissues by varying the optical dose received by different tissues. This variation in optical dose may be due to present medical issues in these tissues (e.g., lesions, sores, etc.). Alternatively, this variation may be due to a statistically higher likelihood of these tissues experiencing such issues. In this example, phototherapy may be used as a preventative treatment.

That is, the particular dose of optical power delivered to the target regions may vary between at least two of the target regions. For example, the target regions may include at least one of: a tonsillar region, buccal tissues of an oral cavity, a hard palate, a soft palate, or the tongue. The particular dose of optical power delivered to the different tissues may be varied based on known effective optical doses for treating different issues. For example, the particular dose for the tonsillar region may be different from the particular dose of optical power delivered to the hard palate.

The particular dose of optical power for each of the target regions may be between 10 milliwatts/cm2 and 150 milliwatts/cm2. The particular dose of optical power received by each of the target regions may not vary between the target regions by more than 20%.

As shown in FIG. 18, the phototherapy system 10 may include a protective barrier 60. The barrier 60 surrounds a portion of the probe 14 inserted into the oral cavity 18. The barrier 60 also improves emission of light 16 from the probe 14 by providing a variation in the diffractive index between a surface of the probe and the oral cavity. The barrier 60 further acts as a biological barrier to the oral cavity 18. For example, the variation in the diffractive index may be caused by a gas or a fluid. In one embodiment, the barrier 60 (also referred to as a protective layer) is overmolded onto the probe 14.

In the embodiment shown in FIG. 15, the probe 14 includes a thermal sensor 64 configured to monitor a surface temperature of the probe 14. The phototherapy system 10 also includes circuitry 62 configured to control emission of the light by the light source 12, such that emission of light 16 by the light source 12 is reduced when the thermal sensor 64 detects a temperature greater than a predetermined level. For example, the predetermined level may be a threshold temperature (e.g., determined to cause tissue damage, damage to a part of the phototherapy system 10, or discomfort to a patient).

The property of light altered by the circuitry 62 may include at least one of: an intensity, a wavelength, a duration of emission, a coherence, time modulation of emission, or a distance of emission from the target regions.

The circuitry 62 may monitor in time the surface temperature using the thermal sensor 64 and determine a profile in time of the monitored surface temperature. When the profile of the monitored surface temperature matches a known pattern indicating that the probe is misaligned, the circuitry 62 may issue a notification. For example, the profile may indicate that a surface temperature of a region of the probe 14 that is not intended to be touching tissue is cooler than expected indicating that the surface of the probe is touching a tissue.

The phototherapy system 10 may additionally include an orientation sensor to provide an alert if the probe is misaligned. For example, the orientation sensor may be located on the probe 14 and issue a notification (e.g., vibrate or make a sound) if the probe 14 is rotated incorrectly when inserted in the oral cavity.

The probe may include sensors positioned to detect sores in the oral cavity 18. For example, the circuitry 62 may determine a position of one or more targeted areas in the oral cavity relative to the probe. The circuitry 14 may then modulate light emission by the light source based on the position of the one or more sores, such that the position of the one or more target areas are preferentially illuminated compared to other locations in the oral cavity. For example, the targeted areas may include at least one of sores, lesions, wounds, and redness. The sensors may be photosensors configured to identify the targeted areas based on visual properties (e.g., color, hue, etc.).

For example, the sensors may be used to identify location (s) of sore(s) in the user's oral cavity. The sensors may comprise thermal sensors or photodetectors. A controller may receive readings from the sensors to identify a location of sore(s) and control the light source(s) such that phototherapy is focused on the sores. For example, the probe may include multiple light sources and the light sources positioned to direct light onto the sores may be preferentially turned on to apply phototherapy to the sores.

Figure 20:
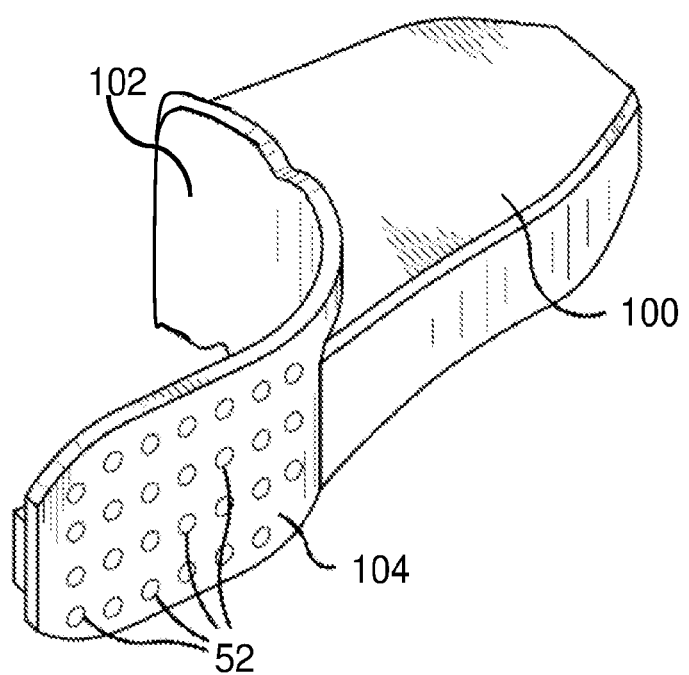
FIG. 20 is a perspective view of an embodiment of a phototherapy device.

In the embodiment shown in FIG. 20, an alternative embodiment of an intraoral phototherapy device 100 for directing light from an associated light source 12 into an oral cavity 18 of a patient is shown. The phototherapy device 100 includes a main body portion 102 and a laterally spaced side wing 104. The main body portion 102 is shaped to conform to contours of the oral cavity when inserted therein to direct the light to targeted regions of the oral cavity. The main body portion 102 includes the laterally spaced side wing 104 sized and shaped to be received between a patient's teeth and cheek for transmitting and directing the light to the targeted regions of the oral cavity. The targeted regions of the oral cavity include the mandibular and maxillary buccal surfaces of the oral cavity.

The intraoral phototherapy device may be used in a number of applications, several examples of which include oral mucositis, acute necrotizing ulcerative gingivitis (ANUG), periodontal diseases, trismus, decreasing recovery time from oral surgery, light delivery for orthodontics, and photodynamic light therapy, e.g., to activate a chemical mouthwash.

The circuitry 62 may have various implementations. For example, the circuitry 62 may include any suitable device, such as a processor (e.g., CPU), programmable circuit, integrated circuit, memory and I/O circuits, an application specific integrated circuit, microcontroller, complex programmable logic device, other programmable circuits, or the like. The circuitry 62 may also include a non-transitory computer readable medium, such as random-access memory (RAM), a read-only memory (ROM), an erasable programmable read-only memory (EPROM or Flash memory), or any other suitable medium. Instructions for performing the method described below may be stored in the non-transitory computer readable medium and executed by the circuitry 62. The circuitry 62 may be communicatively coupled to the computer readable medium and a network interface through a system bus, mother board, or using any other suitable structure known in the art. The circuitry 62 may receive parameters for controlling the light source 12 via the network interface. Alternatively or additionally, the circuitry 62 may receive particular optical doses for different tissues from the network interface and the circuitry 62 may control the light source 12 so that the received optical doses are received by the respective tissues.

The phototherapy device 10 may additionally include a power source. The power source may comprise a battery and/or a plug for connecting to an external source of electricity (e.g., an electrical outlet). For example, the phototherapy device 10 may include a battery configured to provide electrical power to at the light source 12.

The phototherapy device 10 is not limited to use in the oral cavity 18, but may also be used in other phototherapies. For example, the phototherapy device 10 may be used in vaginal, rectal, ear canal, and nasal disorders (e.g., radiation proctitis and/or radiation vaginitis).

Radiation injury is not limited to skin toxicities and can also cause radiation proctitis and radiation vaginitis among other toxicities. Radiation Proctitis can develop acutely or appear later and become a chronic condition. The acute form is the result of superficial mucosal changes in which the mucosa is inflamed, edematous, and friable. Its symptoms include diarrhea, pain, nausea, cramps, urgency, mucus discharge, and bleeding.

In those with prostate and gynecological cancers undergoing radiation treatment, high rates of Radiation Proctitis are noted due to the high dosing of radiation focused to the area. Other highly affected patient populations include colorectal, bladder, and other urinary organ cancers. Brachytherapy has been developed to reduce the volume and area of tissue exposed to radiation for precise anti-cancer treatment and reduction of toxicities. Even with the developments in brachytherapy and radiation therapy, Radiation Proctitis is still a common and severe toxicity.

Beyond Radiation Proctitis, other radiation toxicities include radiation vaginitis, loss of anorectal function, loss of urinary and sexual function, and other GI toxicities. While clinical literature and data are more scarce surrounding these toxicities, they are important toxicities with no cure and high rates of occurrence.

For acute Radiation Proctitis, there are limited solutions and most clinicians ask their patients to push through radiotherapy and the side effects because acute Radiation Proctitis will usually resolve itself after radiotherapy is complete. Meanwhile, during radiotherapy, only supportive medical management such as hydration and anti-diarrheals are commonly utilized. For chronic Radiation Proctitis, treatment options include non-invasive methods such as anti-inflammatory agents, sucralfate, short-chain fatty acid enemas, and anti-oxidants and invasive methods such as ablation and surgery.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A phototherapy system for delivering phototherapy to an oral cavity, the phototherapy system including:
   a light source configured to emit light; and
   a probe configured to direct emission of the light from the light source onto the oral cavity when the probe is positioned within the oral cavity, wherein the probe includes:
      a cylindrical main body having a distal end; and
      a thermal sensor configured to monitor a surface temperature of the obe; and
      different sections controlled to vary an optical dose delivered by each of the sections, wherein each of the sections is configured to illuminate at least one target tissue; and
   a controller configured to control dosage of light to tissues of the oral cavity by:
      monitoring in time the surface temperature of the probe using the thermal sensor;
      determining a profile in time of the monitored surface temperature; and
      issuing a notification when the profile of the monitored surface temperature matches a known pattern indicating that the probe is misaligned.

2. The phototherapy system of claim 1, wherein:
   the light source is adapted to be positioned outside of the oral cavity;
   the probe is configured to act as a light guide by receiving the light emitted by the light source at a proximal end of the probe and transmitting the light to at least one of the distal end of the probe or a lateral surface of the probe; and
   the light source comprises at least one of a light emitting diode (LED) array, a single high-powered LED, a fiber optic transmitting light, or a laser.

3. The phototherapy system of claim 2, wherein the probe includes light-extracting features configured to cause the transmitted light to be emitted from the probe at least one of the distal end of the probe or a lateral surface of the probe.

4. The phototherapy system of claim 3, wherein the light-extracting features comprise at least one of microscopic interruptions to a surface of the probe, lensing features in the probe surface, a rippled surface of the probe, a varying cross-sectional area of the probe, or varying surface finishes along the surface of the probe configured to extract light along a length of the probe.

5. The phototherapy system of claim 1, wherein the probe includes a cladding layer having a varying refractive index and/or a varying thickness to control light emission.

6. The phototherapy system of claim 5, wherein the cladding is shaped to increase uniformity by redistributing light.

7. The phototherapy system of claim 1, wherein the probe has a curved contoured shape adapted to a geometry of an oral palate.

8. The phototherapy system of claim 1, wherein the probe includes location features comprising irregularities in a surface of the probe, the location features configured to, when the probe is located within the oral cavity:
   engage with at least one of teeth, lips, or palate; and
   ensure that the probe is placed in a particular position and orientation within the oral cavity when the location features are positioned adjacent to corresponding structures of the oral cavity.

9. The phototherapy system of claim 1, wherein the probe includes:
   a primary body configured to be positioned with the oral cavity above a tongue when the probe is inserted into the oral cavity; and
   a secondary body configured to be positioned under the tongue while the primary body is adapted to be positioned above the tongue when the probe is inserted into the oral cavity, such that light emitted from the secondary body is adapted to illuminate a ventral surface of the tongue and/or a floor of the mouth including a submandibular duct and/or sublingual glands.

10. The phototherapy system of claim 1, wherein:
    the probe has a shape configured to illuminate lateral edges of a tongue when the probe is inserted into the oral cavity; and
    the shape of the probe is concave and is configured to curve around the tongue and/or the probe includes at least a portion of a tube configured to receive at least a portion of the tongue inside the tube.

11. The phototherapy system of claim 1, wherein the probe includes a lateral surface and the probe is configured to emit light from the lateral surface such that buccal tissues of the oral cavity are illuminated when the probe is inserted into the oral cavity.

12. The phototherapy system of claim 1, wherein the probe is configured to emit light simultaneously from the different sections, such that the light emitted by the probe is configured to provide phototherapy to all targeted tissues simultaneously.

13. The phototherapy system of claim 1, wherein:
    the light source includes multiple light emitters;
    each of the multiple light emitters is associated with one of the different sections, such that each of the different sections emits the light from the associated light emitter; and
    the light source is configured to modulate the light emission by each of the multiple light emitters, such that at least two of the targeted tissues are illuminated at different times when the probe is adapted to be inserted into the oral cavity.

14. The phototherapy system of claim 1, wherein the controller is further configured to control emission of the light by the light source, such that emission of light by the light source is reduced when the thermal sensor detects a temperature greater than a predetermined level.

15. The phototherapy system of claim 1, wherein the light source is configured to emit both therapeutic light and infrared or near infrared light, such that penetration of the therapeutic light into tissues of the oral cavity is improved.

16. The phototherapy system of claim 1, wherein the distal end includes a lensing feature configured to focus light at a distance from the distal end and to target tissues distant from the distal end.

17. The phototherapy system of claim 16, wherein the targeted tissues distant from the distal end include tonsillar tissues.

* * * * *